US012768665B2

(12) United States Patent
Hashimoto

(10) Patent No.: US 12,768,665 B2
(45) Date of Patent: Oct. 20, 2026

(54) SYSTEM AND METHOD FOR PROVIDING ENHANCED NAVIGATION

(71) Applicant: TOYOTA JIDOSHA KABUSHIKI KAISHA, Toyota (JP)

(72) Inventor: Daisuke Hashimoto, Chofu (JP)

(73) Assignee: TOYOTA JIDOSHA KABUSHIKI KAISHA, Toyota (JP)

(*) Notice: Subject to any disclaimer, the term of this patent is extended or adjusted under 35 U.S.C. 154(b) by 76 days.

(21) Appl. No.: 18/619,528

(22) Filed: Mar. 28, 2024

(65) Prior Publication Data

US 2025/0305841 A1 Oct. 2, 2025

(51) Int. Cl.
*G01C 21/34* (2006.01)
*G01C 21/36* (2006.01)

(52) U.S. Cl.
CPC ..... *G01C 21/3484* (2013.01); *G01C 21/3679* (2013.01)

(58) Field of Classification Search
CPC ........................ G01C 21/3484; G01C 21/3679
See application file for complete search history.

(56) References Cited

U.S. PATENT DOCUMENTS 9,291,470 B2* 3/2016 Shin ................... G01C 21/3484
2003/0043045 A1* 3/2003 Yasushi ................. A61M 21/00 340/576
2011/0022298 A1* 1/2011 Kronberg .............. B60W 50/14 701/532
2012/0150429 A1* 6/2012 Siotos ................ G01C 21/3617 701/411
2013/0021463 A1* 1/2013 Hatakeyama .......... A61B 5/746 348/78
2014/0200800 A1* 7/2014 Vogel ................. G01C 21/3453 701/400
2015/0338226 A1* 11/2015 Mason ............. G08G 1/096816 701/408

(Continued)

FOREIGN PATENT DOCUMENTS

JP 2009198217 A * 9/2009
JP 2019-061480 A 4/2019

OTHER PUBLICATIONS

JP-2009198217-A-English Translation (Year: 2009).*

*Primary Examiner* — Faris S Almatrahi
*Assistant Examiner* — Dana F Artimez
(74) *Attorney, Agent, or Firm* — Sughrue Mion, PLLC

(57) ABSTRACT

Example embodiments of the present disclosure provide enhanced navigation to a driver. According to example embodiments, a method for providing enhanced navigation may be provided. The method may include: obtaining, information of a target destination; determining, a plurality of possible routes from a current location of the vehicle to the target destination; obtaining information associated with a current condition of the driver; obtaining information associated with a lifestyle of the driver; predicting, based on the information associated with the current condition of the driver and the information associated with the lifestyle of the driver, a future condition of the driver; selecting, from among the plurality of possible routes based on the predicted future condition of the driver, an optimal route from the current location to the target destination; and presenting, to a driver, information of the optimal route.

20 Claims, 5 Drawing Sheets

(56) References Cited

U.S. PATENT DOCUMENTS

| | | | | |
|---|---|---|---|---|
| 2018/0365998 | A1* | 12/2018 | Shibata ............ | G08G 1/096791 |
| 2020/0182635 | A1 | 6/2020 | Zender et al. | |
| 2022/0001875 | A1 | 1/2022 | Sakai et al. | |
| 2023/0138025 | A1* | 5/2023 | Mathada ............ | G01C 21/3484<br>701/410 |

* cited by examiner

SYSTEM AND METHOD FOR PROVIDING ENHANCED NAVIGATION

TECHNICAL FIELD

Example embodiments of the present disclosure relate to vehicle systems, and more particularly, relate to the provisioning of enhanced navigation for in-vehicle systems.

BACKGROUND

In-vehicle navigation systems utilize a global positioning system (GPS) or a self-contained navigation (SCN) technique to detect the current position of the users (or the vehicle in which the users are located) and display one or more digital maps to provide navigation and guidance to the users. For instance, the users can provide information of a target destination to the navigation system, and the navigation system may compute the route from the current position to the target destination and then display, on the one or more digital maps, the route and the maneuvers (e.g., turns, merges, etc.) needed to reach the target destination. As the vehicle moves and changes position or direction, a vehicle position mark on the map(s) changes to reflect the updated vehicle position/direction.

Nevertheless, navigation systems in the related art rely on algorithms or techniques that compute the route based on factors such as distance, traffic conditions, traveling costs/fees, and road speed limits. While these systems offer valuable navigation in terms of the traveling distance and traveling costs, they fail to account for individualized factors or aspects of the driver, such as the real-time conditions of the driver and the daily lifestyle of the driver, that may impact the driving experience and trip safety.

For instance, the sleep patterns of a driver can affect the driver's alertness and concentration levels. Drivers with irregular sleep patterns or insufficient sleep may have a higher chance of experiencing fatigue during driving, leading to the increased need for taking a brake during the journey. Similarly, drivers with longer work schedules or work that requires more physical strength may have a higher fatigue level as compared to drivers with shorter work schedules or work that requires less physical strength. In addition, drivers with health conditions, such as hypertension, sleep disorder, or bad eyesight, may require regular breaks during the journey to monitor and maintain their health.

Without considering the driver's real-time condition and daily lifestyle, the related art navigation systems may inadvertently lead a driver to travel on a route that is inappropriate or suboptimal for the driver. For instance, the driver may feel fatigued or drowsiness during the journey and may want to stop by a resting area for a break. Nevertheless, the route recommended by the associated navigation system may not include any resting area, or the resting area is far from the location at which the driver started to feel fatigued or drowsiness. As another example, a driver who has poor eyesight conditions may prefer a route that is equipped with street lights. Nevertheless, the route recommended by the navigation system may recommend a dark road because it provides the shortest distance to the target destination and/or is the road without tolls.

In view of at least the above reasons, while the related art systems may provide effective navigation on the fastest and/or cheapest route, they adopt a generic approach in computing the route by treating all drivers and journeys alike without considering the driver's real-time conditions and lifestyle factors.

SUMMARY

Example embodiments consistent with the present disclosure provide methods, systems, and apparatuses for effectively and efficiently determining an optimal route based on real-time conditions and lifestyle information of a driver, thereby providing enhanced navigation to the driver.

According to example embodiments, a method, performable by at least one processor of a system in a vehicle to provide enhanced navigation, is provided. The method may include: obtaining, from a driver of the vehicle, information of a target destination; determining, based on the information of the target destination, a plurality of possible routes from a current location of the vehicle to the target destination; obtaining, from at least one onboard sensor of the vehicle, information associated with a current condition of the driver; obtaining, from a server communicatively coupled to the system, information associated with a lifestyle of the driver; predicting, based on the information associated with the current condition of the driver and the information associated with the lifestyle of the driver, a future condition of the driver; selecting, from among the plurality of possible routes based on the predicted future condition of the driver, an optimal route from the current location to the target destination; and presenting, to the driver, information of the optimal route.

According to example embodiments, a system implemented in a vehicle for providing enhanced navigation is provided. The system may include a memory storage configured to store computer-executable instructions and at least one processor communicatively coupled to the memory storage. The at least one processor may be configured to execute the instructions to: obtain, from a driver of the vehicle, information of a target destination; determine, based on the information of the target destination, a plurality of possible routes from a current location of the vehicle to the target destination; obtain, from at least one onboard sensor of the vehicle, information associated with a current condition of the driver; obtain, from a server communicatively coupled to the system, information associated with a lifestyle of the driver; predict, based on the information associated with the current condition of the driver and the information associated with the lifestyle of the driver, a future condition of the driver; select, from among the plurality of possible routes based on the predicted future condition of the driver, an optimal route from the current location to the target destination; and present, to the driver, information of the optimal route.

Additional aspects will be set forth in part in the description that follows and, in part, will be apparent from the description, or may be realized by practice of the presented embodiments of the disclosure.

BRIEF DESCRIPTION OF THE DRAWINGS

Features, advantages, and significance of exemplary embodiments of the disclosure will be described below with reference to the accompanying drawings, in which like reference numerals denote like elements, and wherein.

DETAILED DESCRIPTION

Figure 1:
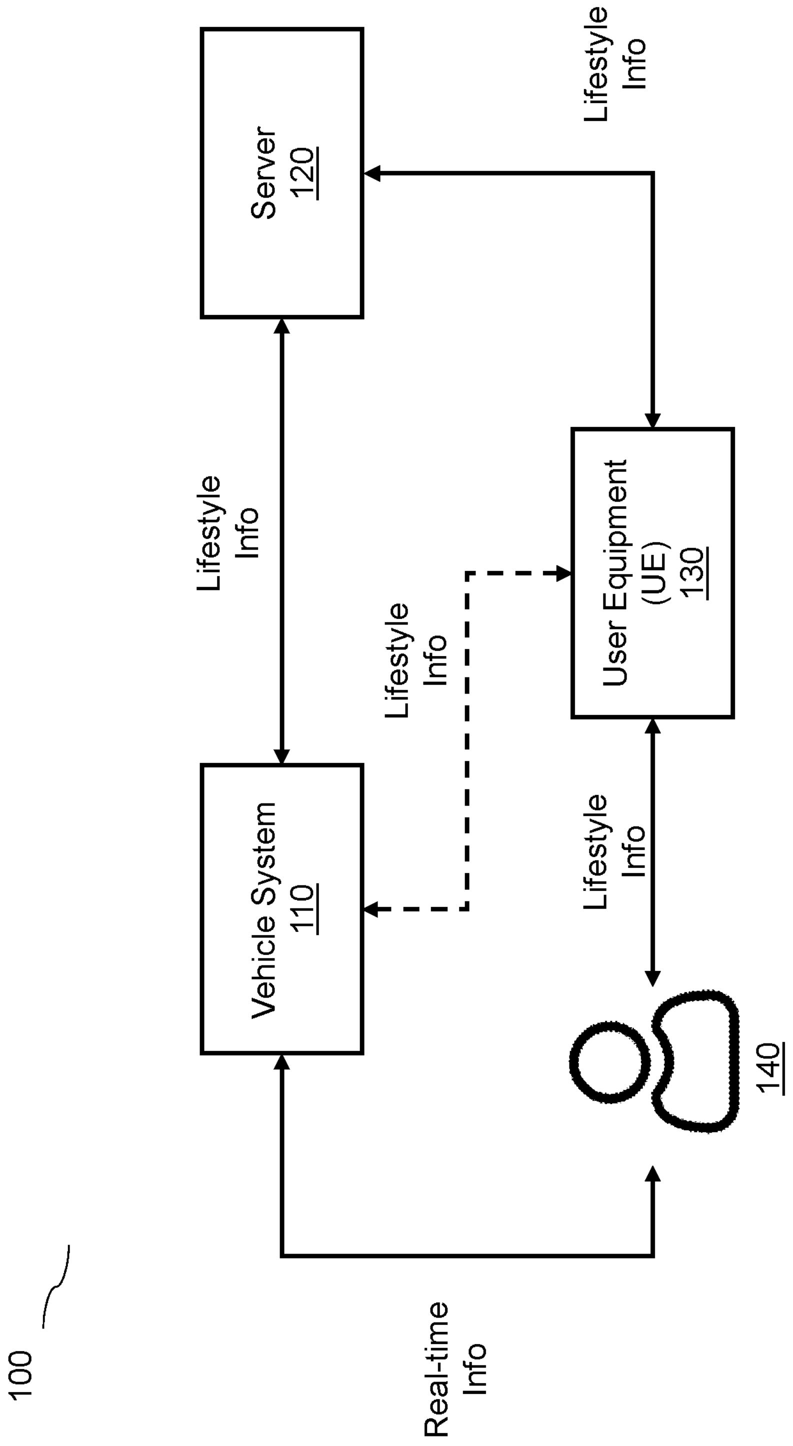
FIG. 1 illustrates a diagram of a generic system architecture, according to one or more example embodiment.

The following detailed description of exemplary embodiments refers to the accompanying drawings. The foregoing disclosure provides illustration and description but is not intended to be exhaustive or to limit the implementations to the precise form disclosed. Modifications and variations are possible in light of the above disclosure or may be acquired from practice of the implementations. Further, one or more features or components of one embodiment may be incorporated into or combined with another embodiment (or one or more features of another embodiment). Additionally, in the flowcharts and descriptions of operations provided below, it is understood that one or more operations may be omitted, one or more operations may be added, one or more operations may be performed simultaneously (at least in part), and the order of one or more operations may be switched.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Where only one item is intended, the term "one" or similar language is used. Also, as used herein, the terms "has," "have," "having," "include," "including," or the like are intended to be open-ended terms. Further, the phrase "based on" is intended to mean "based, at least in part, on" unless explicitly stated otherwise. Furthermore, expressions such as "[A] and/or [B]", "at least one of [A] and [B]" or "at least one of [A] or [B]" are to be understood as including only A, only B, or both A and B.

Reference throughout this specification to "one embodiment," "an embodiment," "non-limiting exemplary embodiment," or similar language means that a particular feature, structure, or characteristic described in connection with the indicated embodiment is included in at least one embodiment of the present solution. Thus, the phrases "in one embodiment", "in an embodiment," "in one non-limiting exemplary embodiment," and similar language throughout this specification may, but do not necessarily, all refer to the same embodiment.

Furthermore, the described features, advantages, and characteristics of the present disclosure may be combined in any suitable manner in one or more embodiments. One skilled in the relevant art will recognize, in light of the description herein, that the present disclosure can be practiced without one or more of the specific features or advantages of a particular embodiment. In other instances, additional features and advantages may be recognized in certain embodiments that may not be present in all embodiments of the present disclosure.

Furthermore, the term "vehicle" described herein refers to any suitable type of vehicle in which example embodiments of the present disclosure can be implemented. For instance, the "vehicle" may refer to a motorized vehicle such as a car, a truck, a bus, a motorcycle, or any other suitable type of automobile powered by an engine, motor, or other mechanical means. Alternatively or additionally, the "vehicle" described herein may refer to a non-motorized vehicle, such as a bicycle, a skateboard, a roller skates, a kick scooter, and the like, without departing from the scope of the present disclosure.

FIG. 1 illustrates a diagram of a generic system architecture 100, according to one or more embodiments. As illustrated in FIG. 1, the system architecture may involve at least one vehicle system 110, at least one server 120, at least one user equipment (UE) 130, and at least one driver 140. It is contemplated that the system architecture 100 in FIG. 1 is simplified for descriptive purposes, and the system architecture 100 may be different according to the actual implementation. For instance, in some implementations, a plurality of servers 120 and/or a plurality of UEs 130 may also be utilized, without departing from the scope of the present disclosure.

The vehicle system 110 may be implemented in a vehicle and may be configured to provide enhanced navigation to a driver of the vehicle. According to example embodiments, the vehicle system 110 may interoperate with a navigation system deployed in the vehicle. Alternatively, the vehicle system 110 may be implemented in or may be part of the navigation system.

The vehicle system 110 may obtain real-time (or near real-time) information (e.g., data or information associated with one or more current conditions of the driver 140, etc.) from the driver 140 and obtain lifestyle information of the driver 140 from the server 120 and/or the UE 130. Further, the vehicle system 110 may receive, from the driver 140, information associated with a target destination and then determine a plurality of possible routes from a current location of the vehicle to the target destination. Accordingly, the vehicle system 110 may predict, based on the information associated with the driver 140 and the information associated with the lifestyle of the driver 140, one or more future conditions of the driver. Subsequently, the vehicle system 110 may select, from among the plurality of possible routes based on the predicted future condition(s) of the driver, an optimal route from the current location to the target destination, and then provide the information of the optimal route to the driver 140, thereby providing enhanced and personalized navigation to the driver 140. Further descriptions of the operations associated with the vehicle system 110 are provided below with reference to FIG. 2 to FIG. 5.

The server 120 may include one or more storage mediums configured to store or record information of the daily lifestyle of the driver 140. Said information may include, for example, a work schedule, a type of work, a wake-up time, a sleeping time, a meal time, a rest time, blood glucose transitions, health history, medical intake history (e.g., time of medical intake, etc.), history of taking medications that may have a side effect (e.g., drowsiness, etc.), history of restroom visits, work stress level history, driving history, and any other information associated with the daily lifestyle of the driver 140.

As illustrated in FIG. 1, the server 120 may be communicatively coupled to the UE 130 and be configured to continuously (or periodically) obtain the daily lifestyle information of the driver 140 therefrom. For instance, the server 120 may have one or more application programming interfaces (API) that communicate with one or more applications implemented in the UE 130, thereby automatically obtaining the daily lifestyle information from the UE 130 when required or applicable. Similarly, the server 120 may be communicatively coupled to the vehicle system 110 and be configured to continuously (or periodically) provide the daily lifestyle information of the driver 140 thereto when required or applicable.

The server 120 may include one or more edge servers located nearby the vehicle system 110 and/or the UE 130, may include one or more central servers located further from the vehicle system 110 and/or the UE 130, or may include a combination of at least one edge server and at least one central server.

The UE 130 may have one or more software applications implemented therein for managing information associated with the daily lifestyle of the driver 140. The one or more software applications may include, for example, a health monitoring application that manages various health metrics of the driver 140 (e.g., sleep patterns, physical activity levels, etc.), a meal planning application that the driver 140 utilizes for tracking daily meals intake (e.g., times for meals, type of meals, etc.), a work schedule application (e.g., calendar or scheduling application for managing work shirts, meetings, appointments, etc.), an alarm clock application that monitors the wake-up times of the driver 140, a blood glucose transitions application (e.g., diabetes management application for tracking blood glucose levels, insulin doses, etc.), a health management application that manages and records medical history of the driver 140 (e.g., vaccination records, historical medical symptoms and treatments, history of taking medications that may have one or more side effects like drowsiness, etc.), a driving history application (e.g., application for logging driving distances, fuel consumption, etc.), and any other suitable application that the driver 140 utilizes in his daily life and approves for sharing the associated information.

The UE 130 may include one or more devices or equipment, such as one or more of: a computing device (e.g., a desktop computer, a laptop computer, a tablet computer, a handheld computer, a smart speaker, etc.), a mobile device (e.g., a smartphone, a smartwatch, a pair of smart glasses, etc.), a SIM-based device, a medical equipment, or any other suitable device which may be associated with the driver 140. In some example embodiments, the UE 130 may include a device that is part of or deployed in the vehicle (e.g., part of the in-vehicle infotainment (IVI) system, etc.)

According to example embodiments, the driver 140 may directly input at least a portion of the lifestyle information to the UE 130. Alternatively or additionally, the UE 130 may automatically obtain the lifestyle information from the driver 140, upon receiving the approval of the driver 140 for doing so. In some example implementations, the UE 130 may include a plurality of devices or equipment, each of which may be communicatively coupled to one another and be configured to exchange information therebetween. For instance, the UE 130 may include a mobile phone in which a health monitoring application is implemented and a smartwatch in which a sensor for monitoring the health metrics (e.g., heart rate, stress level, steps taken, etc.) is implemented. In this case, the smartwatch may continuously (or periodically) provide the information of the measured health metrics to the mobile phone for recording or further processing.

The communication among the vehicle system 110, the server 120, and/or the UE 130 may be performed through one or more wired communications and/or one or more wireless communications. For example, the communication may be performed via one or more of: a cellular network (e.g., a fifth generation (5G) network, a sixth generation (6G) network, a long-term evolution (LTE) network, a third generation (3G) network, a code division multiple access (CDMA) network, etc.), a public land mobile network (PLMN), a local area network (LAN), a closed area network (CAN), a wide area network (WAN), a metropolitan area network (MAN), a telephone network (e.g., a Public Switched Telephone Network (PSTN), etc.), a private network, an ad hoc network, an intranet, the Internet, a fiber optic-based network, or the like.

It is contemplated that the system architecture illustrated in FIG. 1 is only one of the possible configurations, and the actual implementation of the example embodiments is not limited thereto. Specifically, in some implementations, the lifestyle information of the driver 140 may be stored in the vehicle system 110 and/or the UE 130, in alternative to or in addition to being stored in the server 120.

Figure 2:
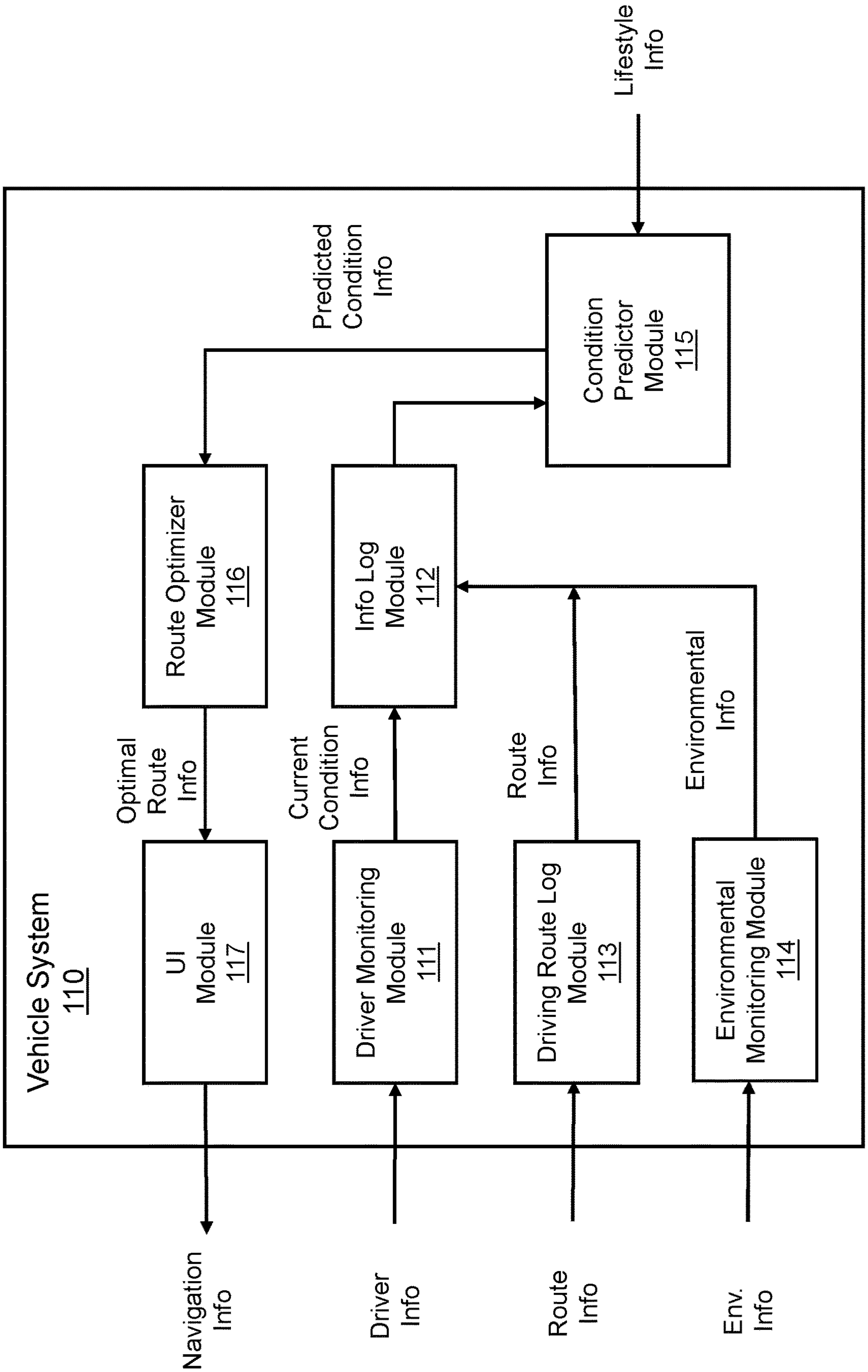
FIG. 2 illustrates a diagram of example functional modules of the vehicle system, according to one or more example embodiments.

FIG. 2 illustrates a diagram of example functional modules of the vehicle system 110, according to one or more embodiments. As illustrated in FIG. 2, the vehicle system 110 may include a plurality of functional modules 111-117. One or more of the modules 111-117 may be implemented in different forms of hardware, firmware, or a combination of hardware and software. In this regard, it is contemplated that one or more operations described herein with reference to each of the modules 111-117 may be performed by a hardware (e.g., a processor, etc.) upon executing a software or computer-executable instructions for implementing the modules 111-117. Further, it is contemplated that one or more of the modules 111-117 may be consolidated into a single module (e.g., the driver monitoring module 111 and the environmental monitoring module 114 may be combined into a monitoring module, etc.) and/or the vehicle system 110 may include more/less module than illustrated in FIG. 2 (e.g., module 114 may be optional in determining the optimal route, etc.), without departing from the scope of the present disclosure.

The driver monitoring module 111 may be configured to monitor and obtain data or information associated with a driver (e.g., the driver 140), in real-time (or near real-time). The data or information may include, for example: a face expression of the driver (e.g., frowns, yawns, etc.), a temperature associated with the driver (e.g., body temperature, seat temperature, etc.), a posture of the driver (e.g., leaning to one side, reclined posture, etc.), a voice of the driver (e.g., a voice tone, a speech pattern, a sound of yawning, etc.), an eye movement of the driver (e.g., a blink rate, a gaze direction, etc.), driver's hand grip force on a steering wheel of the vehicle, information of a location at which the driver has stopped by (e.g., a timing or length of time at which the driver has stopped the car, type of location at which the driver has stopped by, etc.), a vital sign of the driver (e.g., respiration rate, blood pressure, blood oxygen saturation (SpO2), etc.), and driver's driving behavior (e.g., lane drift or weaving, inconsistent driving speed, delayed reaction time, etc.) These data or information may define or be associated with one or more current conditions of the driver, such as a current drowsiness level of the user, a current fatigue level of the user, a current stress level of the user, a current comfort level of the user, and the like.

According to embodiment, the module 111 may be configured to collect the driver information or data from one or more onboard sensors (further described below with reference to FIG. 4), upon determining that the driver has provided or inputted information of a target destination to the vehicle system (or to a navigation system associated with the vehicle system). Alternatively, the module 111 may be configured to collect the driver information or data from the one or more onboard sensors, according to one or more states of the vehicle (e.g., ignition-ON (IG-ON), engine running state, parking state, driving state, cruise control activated state, etc.). In some example implementations, the module 111 may also be configured to collect the driver information or data from the one or more onboard sensors periodically.

According to example embodiments, the module 111 may be configured to perform one or more operations to process the collected data to consolidate meaningful data and to enhance data accuracy, before providing the data to other modules of the vehicle system 110. For instance, the module 111 may perform one or more data filtering operations to reduce the noise in the collected data, may perform one or more data calibration to correct systematic errors in the collected data, may perform one or more data fusion operations to integrate or compile data collected from multiple sensors to create a comprehensive and coherent representation of the driver's condition(s), and the like. In some example embodiments, the module 111 may be configured to determine, based on the collected data and/or processed data, one or more current conditions of the driver (e.g., a current drowsiness level of the driver, etc.)

Upon collecting and processing the driver information or data associated therewith, the module 111 may provide the processed data to other modules of the vehicle system 110 (e.g., the information log module 112, etc.) for further utilization or processing.

The driving route log module 113 may be configured to record information associated with one or more driving routes. Said information may include, for example, geographical coordinates (e.g., GPS coordinates, etc.), road types (e.g., highway, mountain road, city road, etc.), traffic conditions (e.g., traffic jam, traffic incident, etc.), weather conditions (e.g., raining, snowing, sunny, dark environment, etc.), timestamps for route segments and waypoints, route deviations and maneuvers (e.g., lane changes, turns, etc.), and the like.

According to example embodiments, the driving route log module 113 may obtain, from the driver, information associated with a target destination, and then determine at least one route from a current location of the vehicle to the target destination. Alternatively or additionally, the module 113 may simply receive the information of the at least one route from, for example, a route determination module (e.g., deployed in a navigation system, etc.) which is configured to determine the at least one route based on the information associated with the target destination. According to example embodiments, the module 113 may determine, based on the information associated with the target destination, a plurality of routes from the current location to the target destination. Similarly, the module 113 may receive the information of the plurality of routes from the route determination module or the navigation system. Accordingly, the module 113 may store the information associated with the determined route(s). According to example embodiments, the module 113 may be communicatively coupled to the route optimizer module 116 and receive information associated with one or more optimal route(s) determined in the past therefrom.

According to example embodiments, upon receiving the information associated with the target destination, the driving route log module 113 may determine the current location of the vehicle and determine whether or not any of the stored historical routes and/or historical optimal routes is associated with the current location and/or the target destination. Based on determining that the historical route(s) and/or historical optimal route(s) are available, the driving route log module 113 may provide the information associated therewith to the information log module 112. In this way, the information of the historical route(s) and/or historical optimal route(s) can be utilized in determining a new optimal route(s) when the current location of the vehicle is similar to a historical location and/or when the target destination is similar to a historical target destination.

The environmental monitoring module 114 may be configured to monitor and obtain data or information associated with the environment around the driver, in real-time (or near real-time). The data or information may include environmental conditions inside the vehicle, such as the temperature within the vehicle, humidity levels within the vehicle, air quality within the vehicle, noise level within the vehicle, music being played by audio player in the vehicle, driver's conversation with passengers in the vehicle, ventilation and airflow, lighting conditions, vehicle position relative to lane lines and steering, and the like. Further, the data or information may include environmental conditions outside the vehicle, such as temperature outside the vehicle, weather conditions (e.g., rain, snow, fog, windy, etc.), road conditions (e.g., bumpy road, pothole, etc.), traffic conditions, noise level outside the vehicle, and the like. These data or information may impact or be associated with the one or more future conditions of the driver, such as a future drowsiness level of the user, a future fatigue level of the user, a future stress level of the user, a future comfort level of the user, and the like.

Similar to the module 111, the environmental monitoring module 114 may be configured to collect the environmental information or data from one or more onboard sensors (further described below with reference to FIG. 4), upon determining that the driver has provided or inputted information of the target destination to the vehicle system (or to a navigation system associated with the vehicle system). Alternatively, the module 114 may be configured to collect the environmental information or data from the one or more onboard sensors, according to one or more states of the vehicle (e.g., IG-ON, engine running state, parking state, driving state, cruise control activated state, etc.). In addition, the module 114 may be configured to collect the environmental information or data from the one or more onboard sensors periodically.

Further, the module 114 may also be configured to perform one or more operations to process the collected data to consolidate meaningful data and to enhance data accuracy, before providing the data to other modules of the vehicle system 110. For instance, the module 114 may perform one or more data filtering operations to reduce the noise in the collected data, may perform one or more data calibration to correct systematic errors in the collected data, may perform one or more data fusion operations to integrate or compile data collected from multiple sensors to create a comprehensive and coherent representation of the environment surrounding the driver, and the like.

Upon collecting and processing the environmental information or data associated therewith, the module 114 may provide the processed data to other modules of the vehicle system 110 (e.g., the information log module 112, etc.) for further utilization or processing.

The information log module 112 may be configured to receive, store, and process the information or data collected by the driver monitoring module 111, the driving route log module 113, and the environmental monitoring module 114. According to example embodiments, the module 112 may associate or map the information provided by the modules 111, 113, and 114, and then store the associated information in a standardized or unified log data format (e.g., file data) for further analysis or utilization by other modules of the vehicle system 110 (e.g., condition predictor module 115, etc.)

For instance, each of the driver information, driving route information and environmental information may have the associated timestamp and/or location information embedded thereto when being provided by the modules 111, 113, and 114, respectively. In this case, the module 112 may determine, based on the timestamp or location information, which of the driving route information and the environmental information is associated with which of the driver information, and then create and store a log data including one or more driver information along with the associated route information and the associated environmental information.

According to example embodiments, the module 112 may be configured to verify or refine information/data provided by one module with information/data provided by another module. For example, the module 112 may verify or adjust the information/data defining the current condition of the driver provided by the module 111, based on the environmental information provided by the module 114. In this way, the accuracy of the information/data being utilized for predicting the future condition of the driver can be enhanced.

According to example embodiments, the module 112 may persistently or periodically obtain and update the information logs across different states of the vehicle (e.g., IG-ON, IG-OFF, parking state, etc.), such that the real-time (or near real-time) information may be utilized for predicting the future condition(s) of the driver.

The condition predictor module 115 may be configured to predict one or more future conditions of the driver. Specifically, the module 115 may obtain, from one or more storage mediums (e.g., server 120, UE 130, etc.), information associated with the daily lifestyle of the driver, and obtain, from the information log module 112, the information or data associated with the current condition of the driver (e.g., in the form of log data, etc.) Accordingly, the module 115 may predict, based on the information associated with the current condition of the driver and the information associated with the lifestyle of the driver, one or more future conditions of the driver. The predicted future condition(s) may be a function of time and place along the route from the current location to the target destination, and may include a predicted drowsiness level, a predicted eye dryness level, a predicted illness, a predicted level of tension, a predicted level of stiffness, a predicted inadequate vision, a predicted level of the urge to urinate, a predicted level of bowel movement, and the like. By way of example, the predicted drowsiness level may be utilized to determine the timing and location on the route in which the drowsiness level of the driver exceeds a predefined threshold, indicating that the driver may arrive at the location at the timing and started to feel drowsiness.

According to example embodiments, the module 115 may be configured to predict the one or more future conditions of the driver, taking into consideration the environmental information and/or the driving route information (which may be stored together with the information of the current condition of the driver in the associated log data). Specifically, under certain situations, even if the driver is taking the same route which has been previously selected, the time and place that the driver started to feel drowsiness and the like may vary according to the environmental conditions (e.g., temperature inside and/or outside the vehicle, the traveling velocity of the vehicle, weather conditions, etc.), according to the varied driving route conditions (e.g., traffic congestions, etc.), and/or according to the activities that the driver did in the day (e.g. meal time, type of medication taken and time taken, etc.) In this regard, based on the environmental information and/or the driving route information, the module 115 may verify or adjust the predicted future conditions of the driver, thereby increasing the accuracy of the predictions.

According to example embodiments, the driving route log module 113 may determine, based on the information of the target destination provided by the driver, a plurality of possible routes from the current location of the vehicle to the target destination. In that case, the module 115 may determine the one or more future conditions of the drivers for teach of the plurality of routes. Further, the module 115 may utilize one or more artificial intelligence (AI)/machine learning (ML) models (e.g., neural network model, large language model (LLM), support vector machine model, etc.), one or more statistical models (e.g., logistic regression model, time series model, survival analysis model, etc.), and the like, to predict the one or more future conditions of the driver.

The module 115 may be configured to predict the one or more future conditions of the driver, upon determining that a new or updated information log is available (such information may be obtained from the information log module 112, etc.) Alternatively, the module 115 may be configured to predict the one or more future conditions of the driver, according to one or more states of the vehicle (e.g., IG-ON, engine running state, parking state, driving state, cruise control activated state, etc.) Further, the module 115 may also be configured to predict the one or more future conditions of the driver periodically. Upon predicting the one or more future conditions, the module 115 may provide the information of the one or more future conditions to other modules of the vehicle system 110 (e.g., route optimizer module 116, etc.) for further utilization or processing.

The route optimizer module 116 may be configured to receive the one or more predicted future conditions of the driver from the module 115 and then determine an optimal route based thereon. According to example embodiments, the module 116 may obtain information of at least one route from the driving route log module 113 or the information log module 112, and then determine the optimal route based on both the one or more predicted future conditions of the driver and the information of the at least one route. In some implementations, the module 116 may further obtain the environmental information from the module 114, such that the environmental information may be taken into consideration when determining the optimal route.

According to example embodiments, the module 116 may determine whether or not the at least one route (determined based on the current location and the target destination) includes at least one resting point that allows the driver to take a break. Subsequently, based on determining that the at least one route includes at least one resting point, the module 116 may determine whether or not the at least one resting point coincides with a time and a place where the future condition of the driver is predicted to exceed a predefined threshold. Based on determining that the at least one resting point coincides with the time and place where the future condition of the driver is predicted to exceed the predefined threshold, the module 16 may determine that the at least one route is an optimal route. Otherwise, the module 116 may determine (or instruct the module 113 and/or the navigation system to determine) an alternative route based on the information of the target destination and information of the one or more predicted conditions of the driver.

By way of example, the one or more predicted future conditions may include a drowsiness level of the driver, and the module 116 may determine whether or not the at least one route has at least one resting point. Subsequently, based on determining that the at least one route has at least one resting point, the module 116 may determine whether or not the at least one resting point coincides with the time and place where the drowsiness level of the driver is predicted to be exceeding the predefined threshold (e.g., whether or not the at least one resting point is located at or nearby the time and place where the driver is predicted to feel drowsiness). In this regard, if the at least one route includes a resting point that coincides with the time and place where the drowsiness level of the driver is predicted to be exceeding the predefined threshold (indicating that the driver is started to feel drowsiness and is recommended to take a break), the module 116 may determine that the at least one route is the optimal route, since the at least one route includes a resting point that allows the driver to timely take a break when the driver started to feel drowsiness. Otherwise, based on determining that the at least one route does not include any resting point that coincides with the time and place where the drowsiness level of the driver is predicted to be exceeding the predefined threshold, the module 116 may determine (or instruct the module 113 and/or the navigation system to determine) an alternative route. The alternative route may have a longer traveling distance and/or may have a higher traveling cost as compared to the initially determined route, but includes at least one resting point that coincides with the time and place where the drowsiness level of the driver is predicted to be exceeding the predefined threshold.

According to example embodiments, the one or more predicted future conditions may include one or more future conditions of the driver at a plurality of times and a plurality of places along the at least one route. In this case, the module 116 may determine whether or not the at least one route comprises a plurality of resting points that allow the driver to take a break. Subsequently, based on determining that the at least one route includes a plurality of resting points, the module 116 may determine whether or not each of the plurality of resting points coincides with a respective time from among the plurality of times and a respective place from among the plurality of places where the future condition of the driver is predicted to exceed a predefined threshold. Based on determining that each of the plurality of resting points coincides with the respective time and respective place where the future condition of the driver is predicted to exceed the predefined threshold, the module 16 may determine that the at least one route is an optimal route. Otherwise, the module 116 may determine (or instruct the module 113 and/or the navigation system to determine) an alternative route based on the information of the target destination and information of the one or more predicted conditions of the driver. According to example embodiments, the alternative route may include a number of resting points that may allow the driver to take a break thereby reducing or maintaining the one or more predicted future conditions of the driver within the predefined threshold.

According to example embodiments, the at least one route may include a plurality of routes from the current location to the target destination. In this case, the module 116 may select one of the plurality of routes as the optimal route. For instance, the module 116 may select, from among the plurality of routes, the route which has the highest number of resting points (that coincide with a respective time and a respective place where the one or more future conditions of the driver are predicted to exceed the predefined threshold) as the optimal route. Based on determining that more than one of the plurality of routes have the same number of resting points, the module 116 may select the optimal route based on one or more additional factors, such as the distance of the route to the target destination, the traveling cost of the route, the traffic conditions of the route, the road surface of the route, and the like. By way of example, based on determining that multiple routes have the same number of resting points that coincide with the time and place associated with the one or more future conditions of the driver, the module 116 may select the route which has a shortest distance to the target distance as the optimal route, may select the route which has the cheapest traveling cost as the optimal route, may select the route which has the least congested traffic as the optimal route, and the like. In some example embodiments, before selecting the route, the module 116 may ask the driver to approve the route selection via UI module 117. In some example embodiments, the module 116 may present one or more route candidates to the driver and ask the driver to select one of the route candidates via UI module 117.

According to example embodiments, the module 116 may evaluate a plurality of candidates of the driving plans or possible routes, based on the lifestyle information of the driver (e.g., time schedule, etc.), so that where and when the future condition(s) of the driver may exceed the associated threshold (e.g., where an when the driver start feeling drowsiness, etc.) coincide where and when the driver can rest or take a break along the route.

Similar to the condition predictor module 115, the module 116 may utilize one or more AI/ML models and/or one or more statistical models to determine the optimal route. The determination of the optimal route may be triggered according to the state of the vehicle (e.g., changes from a parking state to a driving state, etc.), based on determining that the driver has inputted a new target destination, based on determining that the condition(s) of the driver has changed, and the like. Alternatively or additionally, the determination of the optimal route may be triggered periodically.

Upon determining the optimal route, the module 116 may provide the information of the optimal route to other modules of the vehicle system 110 (e.g., the user interface (UI) module 117, etc.) for further utilization or processing.

The UI module 117 may be configured to generate one or more user interfaces to present, to the driver of the vehicle, navigation information including the optimal route, thereby providing enhanced navigation to the driver. According to example embodiments, the UI module 117 may generate at least one graphical user interface (GUI) including a map with the optimal route presented thereon. The map can be presented in two-dimensional (2D) form and in three-dimensional (3D) form, and may include a plurality of map objects or cartographic features, such as streets, buildings, rivers, gas stations, restaurants, scenic viewpoints, landmarks, sky, topographical/geographical settings, road signs, and any other suitable objects representing one or more parts of the route. The map may further include an icon representing the current location of the vehicle and an icon representing the target destination, and the optimal route connecting the icon of the current location and the icon of the target destination is displayed by being overlapped or superimposed onto the map.

According to example embodiments, the UI module 117 may generate and present at least one GUI that includes information of a recommended optimal route and one or more optional routes, each of which may be presented along with the predicted future condition(s) of the driver. The driver may review the available options on the GUI and appropriately select which optimal route to follow by interacting with the GUI.

Figure 3:
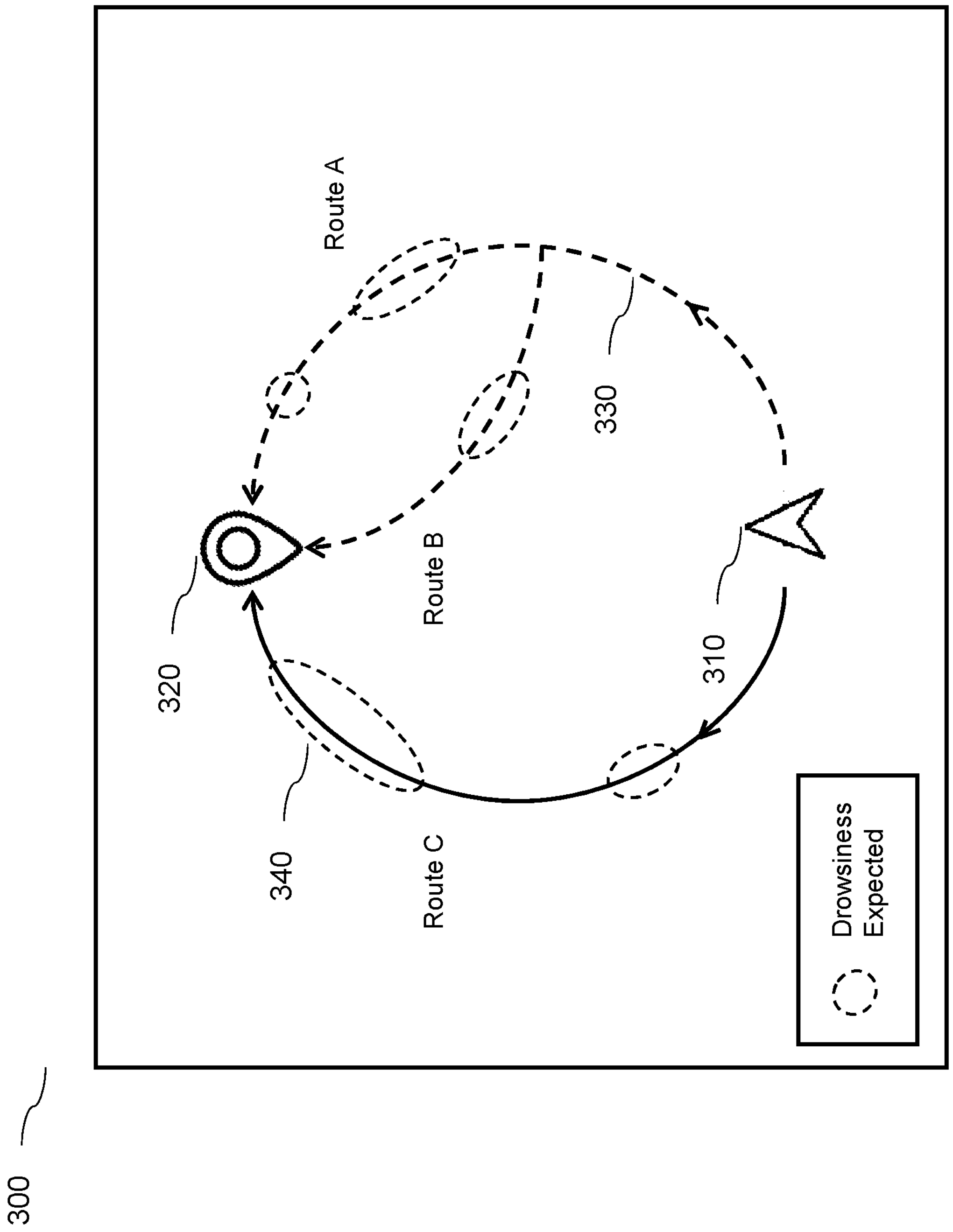
FIG. 3 illustrates a diagram of an example graphical user interface (GUI), according to one or more example embodiments.

Referring to FIG. 3, which illustrates a diagram of an example GUI 300, according to one or more example embodiments. The GUI 300 may include a position mark 310 representing the current location of the vehicle, a destination mark 320 representing the target destination, and a plurality of routes 330 (i.e., route A, route B, and route C) connecting the position mark 310 and the destination mark 320. Each of the routes may include one or more indicators 340 indicating the time and place where the future condition (s) of the driver is predicted to exceed a predefined threshold. In the example of FIG. 3, the indicators 340 indicate when and where the driver is expected to feel drowsiness.

Further, in the example of FIG. 3, it is assumed that each of the routes A-C may include one or more resting points that coincide with the future condition(s) of the driver, which allows the driver to timely take a break or rest when the future condition(s) of the driver is predicted to exceed the predefined threshold (e.g., when the driver is expected to feel drowsiness, etc.) The selected or recommended optimal route may be presented in a distinguishable manner. In the example in FIG. 3, route C is the recommended optimal route and thus is presented in solid lines, while routes A and B are the optional routes and thus are presented in dotted lines. The route C may be selected or recommended by the system since route C has, for example, the shortest distance to the target destination, the cheapest traveling cost, the least congested traffic, and the like. The driver may also choose to select route A or route B to follow by interacting with the GUI 300 (e.g., touching the display panel on which the GUI 300 is presented, etc.) According to example embodiments, based on determining that the driver has selected the optional route (instead of following the recommended optimal route), the module 117 may update the GUI 300 to request the driver to provide the reasoning for selecting the optional route (e.g., a house of the friend of the driver is located at the selected optional route, the driver favorite's restaurant is located at the selected optional route, the driver's favorite scenic view is located at the selected optional route, the driver prefer a costly but faster route, etc.) Accordingly, the vehicle system may utilize such information for determining the optimal route in the future.

It is contemplated that the GUI 300 is merely an example and is simplified for descriptive purposes, and the GUI presented to the driver may be different in actual implementations. For instance, the position mark 310 may be replaced with a vehicle icon (or any other suitable icon representing the current position of the vehicle), the destination mark 320 may be replaced with a flag icon (or any other suitable icon representing the target destination), and the like. Further, the map 300 may include one or more map objects (e.g., buildings, pedestrians, roads, sky, road signs, mountains, landmarks, gas station, resting area, etc.) that resemble one or more parts of the actual scenery surrounding the vehicle when the vehicle travels along the route. Furthermore, in addition to or in alternative to drowsiness, the GUI 300 may include information of any other suitable predicted conditions of the driver, such as eye dryness, fatigue, and the like. Additionally, the module 117 may also present the information of the optimal route by generating and presenting at least one voice user interface (VUI) including an auditory navigation from the current location to the target destination via the optimal route.

The module 117 may provide the at least one GUI to a visual device in the vehicle (e.g., a heads-up display (HUD), an infotainment display, a display of a navigation device, etc.), and provide the at least one VUI to an auditory device in the vehicle (e.g., a speaker, a buzzer, etc.), thereby presenting the visual navigation and/or the auditory navigation to the driver based on the optimal route. Further, the module 117 may continuously update the GUI(s) and/or VUI(s) to present the latest information of the optimal route, may present a reminder or notification to remind the driver to take a break when the vehicle arrives or is nearby the place where one or more future conditions are expected to exceed the predefined threshold, and the like.

To this end, example embodiments of the present disclosure leverage driver monitoring, route logging, and environmental sensing to determine the current condition(s) of the driver in real-time (or near real-time), while integrating analysis of the daily lifestyle of the driver, thereby determining and recommending one or more optimal routes, including one or more resting points for necessary breaks, to ensure personalized navigation and improved user experiences.

Figure 4:
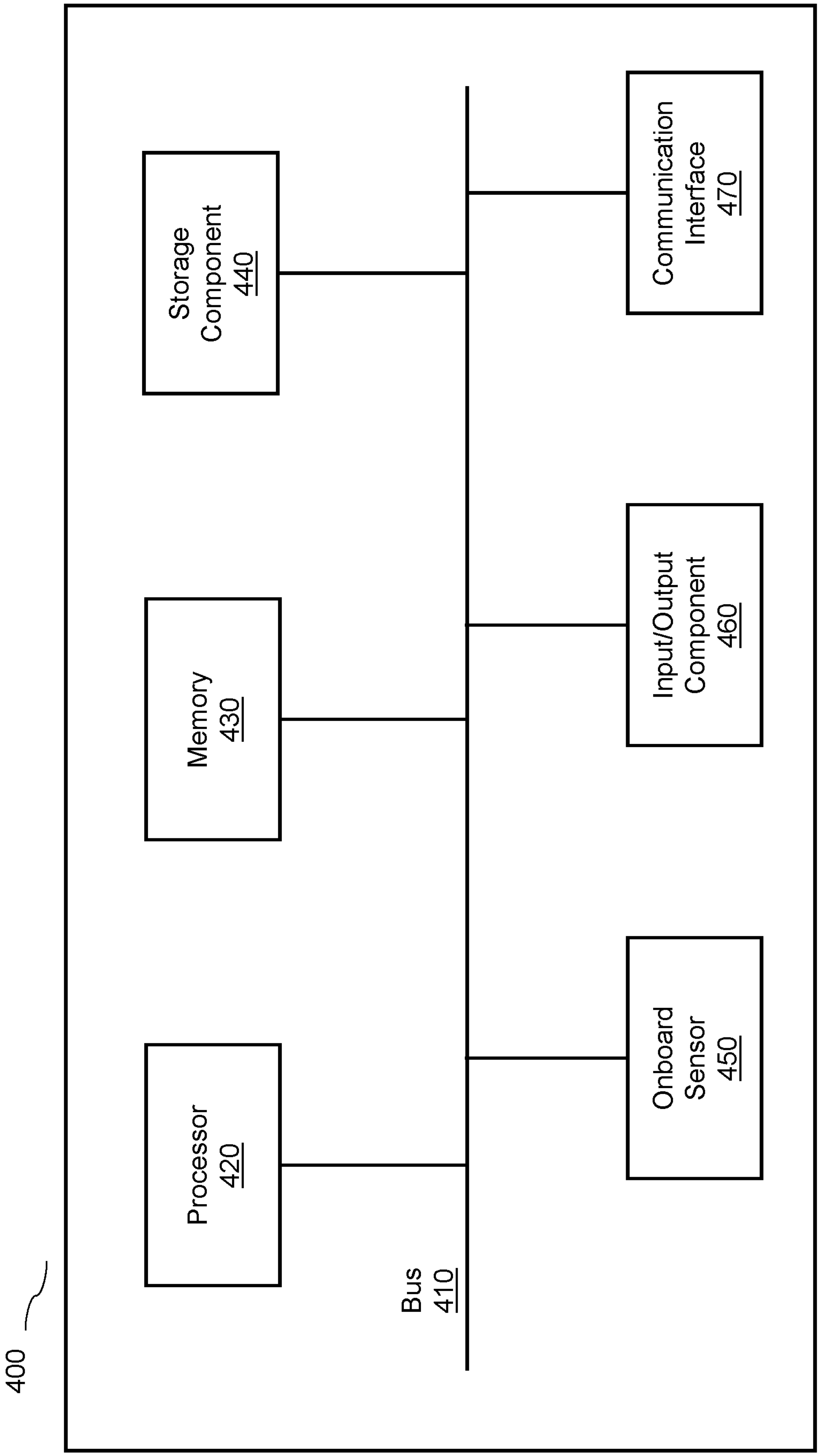
FIG. 4 illustrates a block diagram of example components of a vehicle system, according to one or more example embodiments.

Next, example components of the vehicle system and the operations performable thereby are described with reference to FIG. 4 and FIG. 5. Referring to FIG. 4, which illustrates a block diagram of example components of a vehicle system 400, according to one or more example embodiments. The system 400 in FIG. 4 may correspond to the vehicle system 110 in FIG. 1 and FIG. 2, thus it is contemplated that features described herein with reference to the system 110 and the system 400 may be applicable to each other, unless explicitly described otherwise. Further, one or more components of the vehicle system 110 (e.g., modules 111-117) may be implemented by one or more components of the system 400.

As illustrated in FIG. 4, the system 400 may include at least one bus 410, at least one processor 420, at least one memory 430, at least one storage component 440, at least one onboard sensor 450, at least one input component/output component 460, and at least one communication interface 470. It is contemplated that the system 400 may include more or less components than illustrated in FIG. 4, without departing from the scope of the present disclosure. For instance, in some embodiments, input/output component 460 may include a dedicated input component and a dedicated output component that may operate independently from each other, the system 400 may include a plurality of storage components 440, and the like.

The at least one bus 410 may include one or more components that permit communication among the components of system 400 and permit communication among said components and other systems/components in the vehicle. For instance, the bus 410 may include a controller area network (CAN) bus, a local interconnect network (LIN) bus, an Ethernet bus, and any other suitable types of bus that allow vehicle components, such as components 420-470, actuators, Electronic Control Units (ECUs), and the like, to communicate with each other in real-time (or near real-time).

The at least one processor 420 may be implemented in hardware, firmware, or a combination of hardware and software. According to example embodiments, the processor 420 may include a central processing unit (CPU), a graphics processing unit (GPU), a tensor processing unit (TPU), an accelerated processing unit (APU), a microprocessor, a microcontroller, a digital signal processor (DSP), a field-programmable gate array (FPGA), an application-specific integrated circuit (ASIC), and/or another type of processing or computing component. In some implementations, the processor 420 may include one or more processors capable of being programmed to perform one or more operations described herein. Further, the processor 420 may include a plurality of processing units, each of which is dedicated to perform a specific operation (e.g., each of the modules 111-117 in FIG. 2 may be assigned a dedicated processing unit, etc.)

The at least one memory 430 may include a random access memory (RAM), a read-only memory (ROM), and/or another type of dynamic or static storage device (e.g., a flash memory, a magnetic memory, and/or an optical memory) that stores information and/or instructions for use by the processor 420. The at least one storage component 440 may store information and/or software related to the operation and use of the system 400. For example, the storage component 440 may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

According to example embodiments, the storage component 440 may be configured to store computer-readable or computer-executable instructions for implementing one or more modules of the system (e.g., modules 111-117), one or more AI/ML models or statistical models for implementing the one or more operations of the modules 111-117, one or more driver information, one or more driving route information, one or more environmental information, one or more information log data, one or more predicted future conditions of the driver, one or more determined or selected optimal routes, one or more predefined threshold associated with one or more conditions of the driver, one or more data obtained from external device(s) such as the server 120 and the UE 130, one or more lifestyle information of the driver, one or more historical operations performed by one or more of the modules 111-117, one or more feedbacks provided to and/or received from the driver via one or more user interfaces (e.g., GUIs, VUIs, etc.), one or more map data, one or more data associated with one or more map objects (e.g., static image and/or animation data of map objects, etc.), and/or the like. The storage component 440 may provide the stored information to the memory 430 for the execution of the processor 420. The information log module 112 and driving route log module 113 may be implemented by the memory 430 and/or the storage component 440.

The at least one onboard sensor 450 may include one or more sensors installed in the vehicle and configured to detect, measure, and capture respective sensing data. For instance, the at least one sensor 450 may include one or more of: an accelerometer which measures and captures data associated with the acceleration/deceleration of the vehicle, the vehicle speed, and/or the vehicle travel distance; an image sensor (e.g., camera, etc.) which detects and captures images inside the vehicle (e.g., images of the driver, facial expression of the driver, etc.) and/or image outside the vehicle (e.g., images surrounding or nearby the vehicle, images of roads or lanes, etc.); a light detection and ranging (LiDAR) sensor which detects and captures data associated with light in one or more light spectrums, such as the visible spectrum, the infrared spectrum, the ultraviolet spectrum, and/or any other light spectrums; an audio sensor (e.g., microphone, etc.) which detects and captures audio data inside the vehicle (e.g., voice of the driver, driver's speech tones and patterns, etc.) and/or audio data outside the vehicle; a temperature sensor which measures and captures data associated with temperature inside and/or outside the vehicle; a location sensor (e.g., global positioning system (GPS) receiver, inertial measurement unit (IMU), etc.) which measures and captures data associated with the location, position, and/or orientation of the vehicle; a contact sensor (e.g., pressure detector, impact detector, etc.) which detects and captures data between a portion of the vehicle and an object; an air sensor which measures and captures data associated with the air (e.g., oxygen level, pollution level, humidity level, etc.) inside and/or outside the vehicle; a weather sensor (e.g., rain sensor, snow sensor, wind speed sensor, visibility sensor, etc.) which measures and captures the weather conditions (e.g., possibility and intensity of rainfall, presence of snow or snow accumulation, direction of wind flow and potential wind gusts, potential fog/mist/haze, etc.) around the vehicle; a proximity sensor (e.g., ultrasonic sensor, LiDAR, radar, etc.) which measures the distance between the vehicle and an surrounding object; a biometric sensor which measures the driver's vital signs (e.g., heart rate, blood pressure, etc.); a posture and movement sensor that monitors posture and movements of the driver in the vehicle; an FM/AM receiver which detects radio signal from a road infrastructure of a radio station, thereby receiving information (e.g., broadcast weather reports, traffic updates, emergency alerts, etc.); and any other sensors suitable to be deployed in the vehicle.

The at least one input/output component 460 may include one or more input components (e.g., a touch screen display, a keyboard, a keypad, a mouse, a button, a switch, and/or a microphone) that enable the system 400 to receive information, such as via user input, from the driver. Additionally or alternatively, the input/output component 460 may include one or more output components (e.g., a display, a speaker, a navigation device, one or more light-emitting diodes (LEDs), etc.) that provide output information from the system 400 to the driver.

The at least one communication interface 470 may include a transceiver-like component (e.g., a transceiver and/or a separate receiver and transmitter) that enables the system 400 to communicate with other devices, such as via a wired connection, a wireless connection, or a combination of wired and wireless connections. Communication interface 470 may permit system 400 to receive information from one or more devices outside the vehicle (e.g., one or more devices in other vehicles, a device implemented in a road infrastructure, a device on a bicycle, etc.) and/or provide information thereto. For example, communication interface 470 may include an Ethernet interface, an optical interface, a coaxial interface, an infrared interface, a radio frequency (RF) interface, a universal serial bus (USB) interface, a Wi-Fi interface, a cellular network interface, or the like.

According to one or more embodiments, the communication interface 470 may include at least one input/output (I/O) interface, at least one network interface, at least one sensor interface, at least one storage interface, or the like, that enable the components 420-460 to communicate with other devices outside of the vehicle. Further, the communication interface 470 may include one or more APIs that allow the system 400 (or one or more components included therein) to communicate with one or more software applications (e.g., software applications deployed in the server 120 and the UE 130, etc.)

System 400 may perform one or more operations described herein in response to the at least one processor 420 executing computer-executable instructions for implementing one or more of the functional modules 111-117 in FIG. 2. These computer-executable instructions may be stored by a non-transitory computer-readable recording medium, such as memory 430 and/or storage component 440. A computer-readable medium is defined herein as a non-transitory memory device. A memory device may include memory space within a single physical storage device or memory space spread across multiple physical storage devices.

Computer-executable instructions (e.g., software instructions, etc.) may be read into memory 430 and/or storage component 440 from another computer-readable medium or from another device (e.g., a remote server, an external storage, etc.) via the communication interface 470. When executed, the computer-executable instructions stored in memory 430 and/or storage component 440 may cause the processor 420 to perform one or more processes described herein. Additionally or alternatively, hardwired circuitry may be used in place of or in combination with software instructions to perform one or more processes described herein. Thus, implementations described herein are not limited to any specific combination of hardware circuitry and software.

Figure 5:
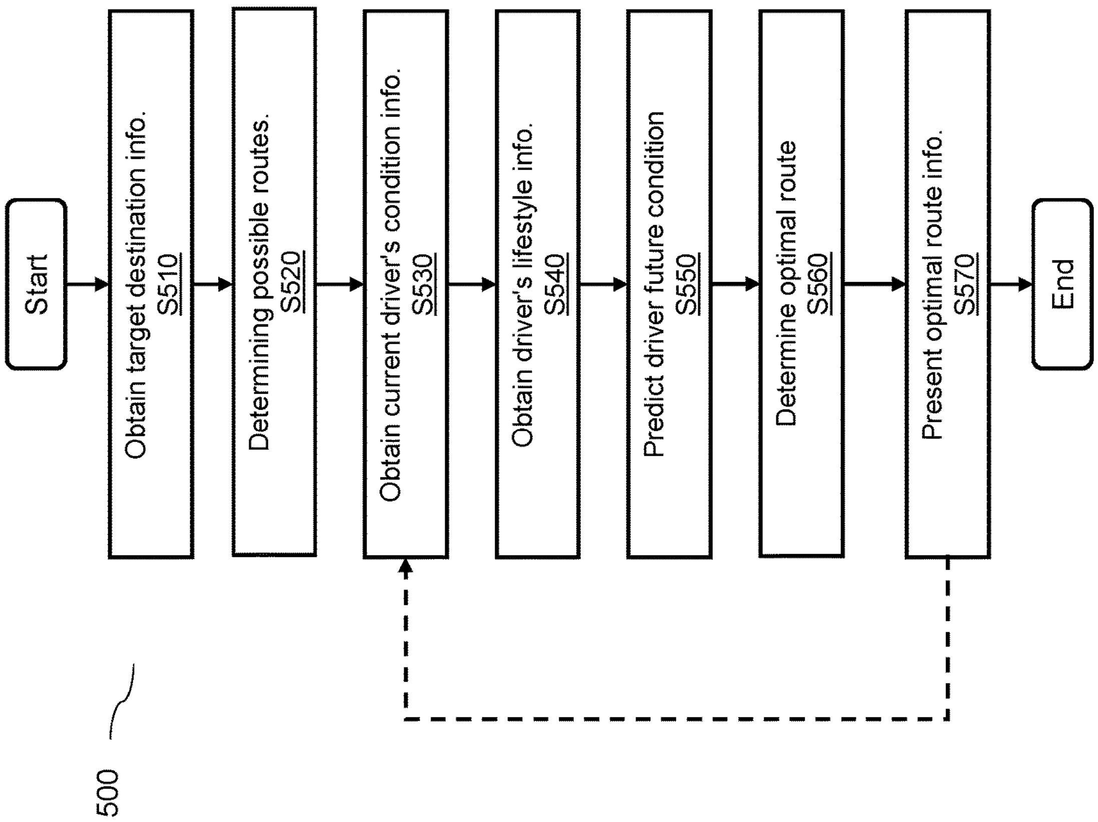
FIG. 5 illustrates a flow diagram of an example method for providing enhanced navigation, according to one or more example embodiments.

FIG. 5 illustrates a flow diagram of an example method 500 for providing enhanced navigation to the driver, according to one or more example embodiments. The method 500 may be performed by at least one processor (e.g., processor 420) of a system implemented in the vehicle (e.g., the vehicle system 110, the vehicle system 400, etc.), upon executing the associated computer-instructions stored in at least one memory storage (e.g., memory 430, storage component 440, etc.) of the system.

Referring to FIG. 5, at operation S510, the at least one processor may be configured to obtain, from a driver of the vehicle, information of a target destination. Specifically the at least one processor may receive a name, an ID, an address, a telephone number associated with the target destination, and any other suitable information that enables the at least one processor to identify the target destination and obtain the coordinates associated therewith from one or more storage mediums (e.g., storage component 440, server 120, etc.) The at least one processor may receive the information of the target destination directly from the driver via an input component (e.g., component 460) or via a UE (e.g., UE 130) communicatively coupled to the vehicle system.

At operation S520, the at least one processor may be configured to determine, based on the information of the target destination, a plurality of possible routes from the current location of the vehicle to the target destination. According to example embodiments, the at least one processor may receive, from one or more location sensors (e.g., GPS sensor, etc.), information defining the current location of the vehicle (e.g., coordinates of the current location of the vehicle on which the location sensor(s) is implemented, etc.), and then determine whether or not the plurality of possible routes is available. Alternatively, the at least one processor may provide the information of the target destination to another system or device (e.g., an in-vehicle navigation system, etc.) and instruct said system/device to determine whether or not the plurality of possible routes is available. In this regard, if only one route is available, the at least one processor may select the route as the optimal route, and the method 500 may be ended or terminated thereafter. Otherwise, based on determining that the plurality of possible routes is available, the method may proceed to further operations of method 500.

At operation S530, the at least one processor may be configured to obtain information associated with one or more current conditions of the driver. For instance, the at least one processor may obtain said information from one or more onboard sensors of the vehicle. The information associated with the current condition of the driver may include, for example, a face expression of the driver, a body temperature of the driver, a posture of the driver, a voice of the driver, an eye movement of the driver, driver's hand grip force on a steering wheel of the vehicle, a timing at which the driver has stopped by a resting point, location information of the resting point at which the driver has stopped by, a vital sign of the driver, driver's driving behavior and any other suitable information that may affect the current conditions of the driver. Each of the information may be associated with one or more current conditions of the driver, such as a current drowsiness level, a current eye dryness level, a current illness, a current level of tension, a current level of body stiffness, a current level of inadequate vision, and the like.

Operation S530 may be performed by the at least one processor upon executing the computer-readable instructions for implementing a driver monitoring module, of which the specific operations have been described above with reference to module 111 in FIG. 2. Thus, further descriptions regarding the specific operations for obtaining the information associated with one or more current conditions of the driver may be omitted below for conciseness.

At operation S530, the at least one processor may be configured to obtain information associated with a lifestyle of the driver. For instance, the at least one processor may obtain said information from one or more servers external to the vehicle or from the UE of the driver. The information associated with the lifestyle of the driver may include, for example, a work schedule, a type of work, a wake-up time, a sleeping time, a meal time (e.g., breakfast time, lunch time, dinner time, coffee time, etc.), a rest time (e.g., a nap time, a short break, etc.), blood glucose transitions, health history, medical intake history, history of medications taken, history of restroom visits, work stress level history, driving history, and any other suitable information of the daily lifestyle of the driver that may affect the condition(s) of the driver.

It is contemplated that operations S530 and S540 may be performed in any suitable sequence, without departing from the scope of the present disclosure. For instance, operations S530 and S540 may be performed simultaneously, operation S540 may be performed prior to operation S530, and the like.

Upon receiving the information associated with the current condition(s) of the driver and the information associated with the lifestyle of the driver, the at least one processor may be configured to predict, based on said information, one or more future conditions of the driver. The one or more future conditions may include, for example, a future drowsiness level, a future eye dryness level, a future illness, a future level of tension, a future level of stiffness, a future level of inadequate vision, future urge to urinate, future bowel movement, and the like. According to example embodiments, the at least one processor may predict the one or more future conditions of the driver at a plurality of times and a plurality of places along each of the possible routes.

Operations S540 and S550 may be performed by the at least one processor upon executing the computer-readable instructions for implementing a condition predictor module, of which the specific operations have been described above with reference to module 115 in FIG. 2. Thus, further descriptions regarding the specific operations for obtaining the information associated with the lifestyle of the driver and for predicting the one or more future conditions of the driver may be omitted below for conciseness.

Upon predicting the one or more future conditions of the driver, the method 500 may proceed to operation S560, at which the at least one processor may be configured to determine an optimal route. Specifically, the at least one processor may select, from among the plurality of possible routes (determined at operation S520) based on the predicted future condition(s) of the driver, the optimal route from the current location to the target location. The optimal route may include at least one resting point that allows the driver to take a break. The at least one resting point may coincide with a time and a place where the one or more future conditions of the driver are predicted to exceed a respective, predefined threshold. According to example embodiments at which the at least one processor has predicted one or more future conditions of the driver at a plurality of times and a plurality of places along each of the possible routes, the optimal route may include a plurality of resting points that allow the driver to take a break, and each of the plurality of resting points may coincide with a respective time from among the plurality of times and a respective place from among the plurality of places where the future condition(s) of the driver is predicted to exceed the predefined threshold. The at least one resting point may include at least one of: a rest area, a restaurant, a truck stop, a parking area, a travel plaza, a scenic viewpoint, and an accommodation facility (e.g., hotel, motel, etc.)

According to example embodiments, the at least one processor may select, from among the plurality of possible routes, the route which has the highest number of resting point as the optimal route. By way of example, the current condition of the driver may include a current drowsiness level of the driver and the future condition of the driver may include a future drowsiness level of the driver. In this regard, the at least one processor may select the optimal route by determining one or more resting points that allow the driver to take a break along each of the possible routes, while the one or more resting points coincide with a time and a place where the current drowsiness level arrives at the future drowsiness level or where the future drowsiness level is predicted to exceed a predefined threshold. Accordingly, the at least one processor may select, from among the plurality of possible routes, the route which has the highest number of resting points as the optimal route. In this way, the at least one processor can ensure that where and when the driver may feel drowsiness coincide with where and when the driver can take a break along the optimal route.

According to example embodiments, based on determining that the plurality of possible routes have the same number of resting points, the at least one processor may select the route which has a shortest distance to the target destination, the route which has the cheapest traveling cost, and/or the route which has the least congested traffic, as the optimal route.

Operation S560 may be performed by the at least one processor upon executing the computer-readable instructions for implementing a route optimizer module, of which the specific operations have been described above with reference to module 116 in FIG. 2. Thus, further descriptions regarding the specific operations for determining the optimal route may be omitted below for conciseness.

Upon determining the optimal route, the method 500 may proceed to operation S570, at which the at least one processor may be configured to present the information of the optimal route to the driver. Specifically, the at least one processor may generate one or more user interfaces (e.g., GUI, VUI, etc.) that include the information of the optimal route, and then present the one or more user interfaces to the driver. According to example embodiments, the at least one processor may generate a map (e.g., 2D map, 3D map) that includes the optimal route, along with other navigation information (e.g., expected arrival time, distance from the target destination, traffic information, directions toward the target destination, etc.) and map objects (e.g., roads, trees, sky, mountain, buildings, gas station, road signs, etc.) that resemble one or more parts of the environment around the vehicle when the vehicle travels along the optimal route.

Operation S570 may be performed by the at least one processor upon executing the computer-readable instructions for implementing a UI module, of which the specific operations have been described above with reference to UI module 117 in FIG. 2. Thus, further descriptions regarding the specific operations for presenting the information of the optimal route may be omitted below for conciseness.

Upon presenting the information of the optimal route, the method 500 may be ended or terminated. Alternatively, the method 500 may return to operation S530, such that the at least one processor may repeatedly perform, for at least a period of time, the obtaining the information associated with the current condition of the driver (at operation S530), the obtaining the information associated with the lifestyle of the driver (at operation S540), the predicting the future condition of the driver (at operation S550), the selecting the optimal route (at operation S560), and the presenting the information of the optimal route (at operation S570). In this way, the optimal route may be continuously (or periodically) updated based on the most updated information, and the information of the optimal route may be updated according to the status or conditions of the driver.

In view of the above, example embodiments of the present disclosure tailor the route recommendations based on the driver's conditions and lifestyle, thereby promoting a more personalized navigation and stress-free driving experience to the driver. Further, by predicting the driver's future condition(s) and recommending the route based thereon, the driver can timely take a break whenever the condition(s) exceeds a predefined threshold (e.g., a threshold indicating a high risk of affecting the health of the driver, a threshold indicating a high risk of causing a road accident, etc.), thereby reducing the risk of accidents and enhancing overall road safety. Furthermore, by providing strategic break recommendations, the driver can remain alert and refreshed throughout the journey, thereby optimizing efficiency and minimizing travel disruptions. Similarly, by enabling the driver to take regular breaks along the recommended journey, example embodiments can promote healthy driving habits and contribute to long-term driver well-being.

It is contemplated that features, advantages, and significances of example embodiments described hereinabove are merely a portion of the present disclosure, and are not intended to be exhaustive or to limit the scope of the present disclosure. Further descriptions of the features, components, configuration, operations, and implementations of example embodiments of the present disclosure, as well as the associated technical advantages and significances, are provided in the following.

It is understood that the specific order or hierarchy of blocks in the processes/flowcharts disclosed herein is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

Some embodiments may relate to a system, a method, and/or a computer-readable medium at any possible technical detail level of integration. Further, as described hereinabove, one or more of the above components described above may be implemented as instructions stored on a computer readable medium and executable by at least one processor (and/or may include at least one processor). The computer-readable medium may include a computer-readable non-transitory storage medium (or media) having computer-readable program instructions thereon for causing a processor to carry out operations.

The computer readable storage medium can be a tangible device that can retain and store instructions for use by an instruction execution device. The computer-readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer-readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer-readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer-readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program code/instructions for carrying out operations may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object-oriented programming languages such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects or operations.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer-readable storage medium that can direct a computer, a programmable data processing apparatus, and/or other devices to function in a particular manner, such that the computer-readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or another device to cause a series of operational steps to be performed on the computer, other programmable apparatus or other device to produce a computer-implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer-readable media according to various embodiments. In this regard, each block in the flowchart or block diagrams may represent a module, segment, or portion of instructions, which comprises one or more executable instructions for implementing the specified logical function(s). The method, computer system, and computer-readable medium may include additional blocks, fewer blocks, different blocks, or differently arranged blocks than those depicted in the Figures. In some alternative implementations, the functions noted in the blocks may occur out of the order noted in the Figures. For example, two blocks shown in succession may, in fact, be executed concurrently or substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware may be designed to implement the systems and/or methods based on the description herein.

What is claimed is:

1. A method, performed by at least one processor of a system in a vehicle, for providing enhanced navigation, the method comprising:

obtaining, from a driver of the vehicle, information of a target destination;

determining, based on the information of the target destination, a plurality of possible routes from a current location of the vehicle to the target destination;

obtaining, from at least one onboard sensor of the vehicle, information associated with a current condition of the driver;

obtaining, from a server communicatively coupled to the system, information associated with a lifestyle of the driver;

predicting, based on the information associated with the current condition of the driver and the information associated with the lifestyle of the driver, a future condition of the driver;

selecting, from among the plurality of possible routes based on the predicted future condition of the driver, an optimal route from the current location to the target destination;

repeatedly and continuously updating the information associated with the current condition of the driver by monitoring sensor signals indicative of a current level of the driver's tension or body stiffness; and continuously updating, by the at least one processor, based on the updated current condition of the driver, the optimal route to the target destination; and presenting, to the driver, information of the optimal route, wherein the information associated with the current condition of the driver comprises at least one of: a posture of the driver or the driver's hand grip force on a steering wheel of the vehicle; and wherein the information associated with the lifestyle of the driver comprises at least one of: blood glucose transitions, medical intake history, history of restroom visits, and work stress level history.

2. The method according to claim 1, wherein the optimal route comprises at least one resting point that allows the driver to take a break, and wherein the at least one resting point coincides with a time and a place where the future condition of the driver is predicted to exceed a predefined threshold.

3. The method according to claim 2, wherein the at least one resting point comprises at least one of: a rest area, a restaurant, a truck stop, a parking area, a travel plaza, a scenic viewpoint, and an accommodation facility.

4. The method according to claim 1, wherein the predicting the future condition comprises predicting the future condition of the driver at a plurality of times and a plurality of places along each of the possible routes; and wherein the optimal route comprises a plurality of resting points that allow the driver to take a break, each of the plurality of resting points coincides with a respective time from among the plurality of times and a respective place from among the plurality of places where the future condition of the driver is predicted to exceed a predefined threshold.

5. The method according to claim 1, wherein the current condition comprises a current drowsiness level of the driver and the future condition comprises a future drowsiness level of the driver;

wherein the selecting the optimal route comprises:

determining, based on the information associated with the driver and the information associated with the lifestyle of the driver, one or more resting points that allow the driver to take a break along each of the possible routes, wherein the one or more resting points coincide with a time and a place where the future drowsiness level of the driver is predicted to exceed a predefined threshold; and selecting, from among the plurality of possible routes, the route which has a highest number of resting point as the optimal route.

6. The method according to claim 5, wherein the selecting the optimal route further comprises:

based on determining that the plurality of possible routes have the same number of resting points, selecting the route which has a shortest distance to the target destination as the optimal route.

7. The method according to claim 5, wherein the selecting the optimal route further comprises:

based on determining that the plurality of possible routes have the same number of resting points, selecting the route which has a cheapest traveling cost as the optimal route.

8. The method according to claim 5, wherein the selecting the optimal route further comprises:

based on determining that the plurality of possible routes have the same number of resting points, selecting the route which has a least congested traffic as the optimal route.

9. The method according to claim 1, wherein the information associated with the lifestyle of the driver comprises:

a work schedule, a type of work, a wake-up time, a sleeping time, a meal time, a rest time, health history, history of medications taken, and driving history.

10. The method according to claim 1, further comprising:

repeatedly performing, for at least a period of time, the obtaining the information associated with the current condition of the driver, the obtaining the information associated with the lifestyle of the driver, the predicting the future condition of the driver, the selecting the optimal route, and the presenting the information of the optimal route.

11. The method according to claim 1, wherein the future condition of the driver comprises at least one of: a future eye dryness level, a future level of stiffness, a future level of inadequate vision, future urge to urinate, or future bowel movement.

12. A system implemented in a vehicle for providing enhanced navigation, the system comprising:

a memory storage storing computer-executable instructions; and at least one processor communicatively coupled to the memory storage, wherein the at least one processor is configured to execute the instructions to:

obtain, from a driver of the vehicle, information of a target destination;

determine, based on the information of the target destination, a plurality of possible routes from a current location of the vehicle to the target destination;

obtain, from at least one onboard sensor of the vehicle, information associated with a current condition of the driver;

obtain, from a server communicatively coupled to the system, information associated with a lifestyle of the driver;

predict, based on the information associated with the current condition of the driver and the information associated with the lifestyle of the driver, a future condition of the driver;

select, from among the plurality of possible routes based on the predicted future condition of the driver, an optimal route from the current location to the target destination;

repeatedly and continuously updating the information associated with the current condition of the driver by monitoring sensor signals indicative of a current level of the driver's tension or body stiffness; and continuously updating, by the at least one processor, based on the updated current condition of the driver, the optimal route to the target destination; and present, to the driver, information of the optimal route, wherein the information associated with the current condition of the driver comprises at least one of: a posture of the driver or the driver's hand grip force on a steering wheel of the vehicle; and wherein the information associated with the lifestyle of the driver comprises at least one of: blood glucose transitions, medical intake history, history of restroom visits, and work stress level history.

13. The system according to claim 12, further comprising:

wherein the optimal route comprises at least one resting point that allows the driver to take a break, and wherein the at least one resting point coincides with a time and a place where the future condition of the driver is predicted to exceed a predefined threshold.

14. The system according to claim 13, wherein the at least one resting point comprises at least one of: a rest area, a restaurant, a truck stop, a parking area, a travel plaza, a scenic viewpoint, and an accommodation facility; and wherein the information associated with the lifestyle of the driver further comprises: a work schedule, a type of work, a wake-up time, a sleeping time, a meal time, a rest time, health history, history of medications taken, and driving history.

15. The system according to claim 12, wherein the at least one processor is configured to predict the future condition of the driver by: predicting the future condition of the driver at a plurality of times and a plurality of places along each of the possible routes; and wherein the optimal route comprises a plurality of resting points that allow the driver to take a break, each of the plurality of resting points coincides with a respective time from among the plurality of times and a respective place from among the plurality of places where the future condition of the driver is predicted to exceed a predefined threshold.

16. The system according to claim 12, wherein the current condition comprises a current drowsiness level of the driver and the future condition comprises a future drowsiness level of the driver;

wherein the at least one processor is configured to select the optimal route by:

determining, based on the information associated with the driver and the information associated with the lifestyle of the driver, one or more resting points that allow the driver to take a break along each of the possible routes, wherein the one or more resting points coincide with a time and a place where the future drowsiness level of the driver is predicted to exceed a predefined threshold; and selecting, from among the plurality of possible routes, the route which has a highest number of resting point as the optimal route.

17. The system according to claim 16, wherein the at least one processor is further configured to select the optimal route by:

based on determining that the plurality of possible routes have the same number of resting points, selecting the route which has a shortest distance to the target destination as the optimal route.

18. The system according to claim 16, wherein the at least one processor is further configured to select the optimal route by:

based on determining that the plurality of possible routes have the same number of resting points, selecting the route which has a cheapest traveling cost as the optimal route.

19. The system according to claim 16, wherein the determining the optimal route further comprises:

based on determining that the plurality of possible routes have the same number of resting points, selecting the route which has a least congested traffic as the optimal route.

20. The system according to claim 12, wherein the at least one processor is further configured to repeatedly perform, for at least a period of time, the obtaining the information associated with the current condition of the driver, the obtaining the information associated with the lifestyle of the driver, the predicting the future condition of the driver, the selecting the optimal route, and the presenting the information of the optimal route.

* * * * *